United States Patent [19]

Wenzler

[11] Patent Number: 5,741,470
[45] Date of Patent: Apr. 21, 1998

[54] METHOD AND DEVICE FOR REMOVAL OF ETHYLENE OXIDE GAS

[75] Inventor: Horst Wenzler, Freiburg-Tiengen, Germany

[73] Assignee: Benedikt-Kreutz-Rehabilitationszentrum Für Herz-und Kreizlaufkranke Bad Krozingen E.V., Krozingen, Germany

[21] Appl. No.: 31,430

[22] Filed: Mar. 17, 1993

Related U.S. Application Data

[63] Continuation of PCT/DE92/00401, filed May 9, 1992.

[51] Int. Cl.$^6$ .................................................. B01D 53/72
[52] U.S. Cl. .................................... 423/245.2; 423/245.1; 95/92
[58] Field of Search ................... 423/245.1, 245.2; 502/439, 418, 27; 55/74, 77; 95/92

[56] References Cited

U.S. PATENT DOCUMENTS

| | | | |
|---|---|---|---|
| 1,954,395 | 4/1934 | Stampe | 422/35 |
| 3,163,494 | 12/1964 | Kaye | 422/30 |
| 3,851,043 | 11/1974 | Gunther | 423/245.1 |
| 4,423,005 | 12/1983 | Murtaugh et al. | 422/61 |
| 4,612,026 | 9/1986 | Pollara et al. | 55/274 |
| 4,828,810 | 5/1989 | Kruse et al. | 423/245.1 |
| 4,831,196 | 5/1989 | Buonicore et al. | 568/867 |
| 5,220,042 | 6/1993 | Iwaki et al. | 552/307 |

FOREIGN PATENT DOCUMENTS

| | | |
|---|---|---|
| 0125520 | 11/1984 | European Pat. Off. |
| 0434955 | 11/1990 | European Pat. Off. |
| 2496485 | 6/1982 | France |
| 2333574 | 7/1973 | Germany |
| 2430355 | 1/1976 | Germany |
| 3835161 | 10/1988 | Germany |
| 2223223 | 4/1990 | United Kingdom |

OTHER PUBLICATIONS

Ulrich Förstner, Umweltschutz Technik, 1990; pp. 69, 177, 186–187, 226,227, 394–395, No Month.
Chemie, Veb Fachbuchverlag Leipzig 1965, pp. 252–253, No Month.
Processes for Air Pollution Control, $2^{nd}$ ed. CRC Press, (1972) pp. 271–275.
Patent Abstracts of Japan; 63–137730; Jun. 9, 1988.
Central Patents Index; AN 77–73238Y; JP.A.52 103 377; Aug. 30, 1977.
Osteroth, D.; Chemisch–Technisches Lexikon; 1979; p. 7.
Krill, H.; Adsorption organischer Stoffe and Aktivkohle; 1976; pp. 298–302.

Primary Examiner—Michael Lewis
Assistant Examiner—Stuart L. Hendrickson
Attorney, Agent, or Firm—Robert W. Becker & Associates

[57] ABSTRACT

A method and a device for the removal of ethylene oxide gas present at high concentrations, for example, 1,000 to 1,000,000 ppm, in exhaust gas is described, which is especially suitable for exhaust gases of gas sterilization chambers. It is suggested to adsorb ethylene oxide from the exhaust gas with a dry adsorbing medium. In an alternative it is suggested to absorb and/or catalytically convert ethylene oxide with an absorbing medium and/or a catalyst carrier in the presence of water and a catalyst. A further variant of the method suggests to oxidize or reduce ethylene oxide by adding an oxidizing or reducing agent and water in the presence of a carrier for the oxidizing or reducing agent, whereby the carrier, depending on the oxidizing or reducing agent used, acts simultaneously as a catalyst and/or filling material.

19 Claims, No Drawings

METHOD AND DEVICE FOR REMOVAL OF ETHYLENE OXIDE GAS

This application is a continuation of Application Ser. No. PCT/DE92/00401, filed May 9, 1992.

BACKGROUND OF THE INVENTION

The present invention relates to a method for remedying a gas, especially air, with high concentrations of more than 1,000 ppm of ethylene oxide, for example, of ethylene oxide-containing gas resulting from a gas sterilization process in sterilization chambers. The invention further relates to a device for performing the remediation method.

Ethylene oxide is characterized by very good microbiocidal properties. Due to the bactericidal effect ethylene oxide is therefore used as a sterilization gas for sterilizing of preferably thermally instable objects, for example, of heart catheters and other medical instruments and devices in hospitals. For this purpose, special sterilization chambers for the gas sterilization process are provided into which the objects to be sterilized are introduced. Depending on the respectively used gas sterilization method (low pressure, equal pressure, or high pressure methods), ethylene oxide is introduced into the sterilization chamber for performing the sterilization. After completion of sterilization the ethylene oxide gas is removed from the sterilization chamber, for example, by releasing it via respective lines directly into the atmosphere. Ethylene oxide is well suited for sterilizing heat-sensitive instruments or materials without damaging these materials; however, ethylene oxide has decisive disadvantages which make it into a problematic compound. For example, ethylene oxide is greatly explosive in a range of 2.7 to 100 vol.-% in air. At low temperatures it solidifies and must be melted. First of all, ethylene oxide is toxic and especially carcinogenic. Thus, when ethylene oxide is released directly into the atmosphere, under certain circumstances, depending on the weather conditions, a considerable health hazard for persons in the vicinity of the release location results. For these reasons, based on the presently air quality regulations in effect, during the emission of ethylene oxide at a mass flow of 25 g/h or more a mass concentration of 5 mg/m$^3$ in the exhaust gas, corresponding to 2.8 ppm, may not be surpassed.

For the removal of ethylene oxide gas an exhaust gas remediation method as well as an exhaust gas scrubber operating on the absorption principle have been suggested in the past. However, these known methods are technically demanding and can only be realized with a great cost expenditure whereby however the resulting remediation quality is not always optimal for the high mass concentrations of ethylene oxide resulting from the gas sterilization processes.

The particular field of endeavor invention of the inventive method is thus the remediation of ethylene oxide-containing gases from gas sterilization processes in sterilization chambers with the resulting especially high mass concentrations of ethylene oxide. The mass concentration of ethylene oxide for a known sterilization chamber is approximately 1,500,000 mg/m$^3$ which corresponds approximately to 845,000 ppm. A newer version of such sterilization chambers has an ethylene oxide concentration of approximately 680,000 ppm. These high mass concentrations of ethylene oxide represent the preferred field of application for the inventive remediation method. Nonetheless, the inventive remediation method also extends to ethylene oxide gas concentrations of more than 1,000,000 ppm, but also to mass concentrations between 1,000 ppm and 100,000 ppm. The particular field of endeavor of the invention should be considered within a concentration range between 100,000 ppm and 1,000,000 ppm, i.e., in a range in which the gas sterilization process is commonly performed.

It is therefore an object of the present invention to provide a simple method as well as a device for performing the method for remedying a gas containing high concentrations of ethylene oxide, for example, resulting from the gas sterilization process in sterilization chambers.

SUMMARY OF THE INVENTION

The remediation method of the present invention for a gas containing high concentrations of more than 1,000 ppm ethylene oxide comprises the steps of:

a) Adsorbing ethylene oxide from the gas with a dry adsorbing medium; and/or b) In the presence of water and a catalyzt absorbing ethylene oxide and/or catalytically converting ethylene oxide with an absorbing medium and/or a catalyst carrier; and/or c) In the presence of water and an oxidizing or reducing agent oxidizing or reducing ethylene oxide with a carrier for the oxidizing or reducing agent, the carrier, depending on the oxidizing or reducing agent used, acting simultaneously as a catalyst and/or filling material.

The inventive remediation method, respectively, a removal method for ethylene oxide from a gas, according to the inventive technical teaching, especially for ethylene oxide-containing gas with especially high mass concentrations of up to 1,000,000 ppm of ethylene oxide, as, for example, resulting from the gas sterilization in sterilization chambers, has the advantage that in a technically simple and economical manner a removal of ethylene oxide and a remediation of the ethylene oxide-containing exhaust gas with an optimal concentration reduction of ethylene oxide contained in the exhaust gas is possible. The concentration reduction is such that for the remediation of ethylene oxide-containing gas from sterilization chambers the final concentration is below the limit of detection. Depending on how the respective method is performed, a physio-sorption and/or a chemo-sorption and/or an oxidation or reduction at a special adsorbing medium or absorbing medium or catalyst carrier or carrier for an oxidizing or reducing agent takes place.

Preferably, activated charcoal is used as the adsorbing medium, the absorbing medium, the catalyst carrier, the catalyst, the carrier for the oxidizing or the reducing agent, and the filling material.

In the physio-sorption method, an adsorption takes place, i.e., the ethylene oxide molecules to be adsorbed adhere to the great specific surface area of the adsorbing medium by physical bonding. Due to the special physical and chemical properties of ethylene oxide it is surprising in this context that simply by adsorption a removal of ethylene oxide at the given mass concentrations resulting, for example, from gas sterilization processes, is possible. After complete loading of the adsorbing medium with ethylene oxide, the adsorbing medium can be regenerated, for example, by a washing step, subsequently dried, and then reused for further ethylene oxide adsorption. The washing step during regeneration converts the ethylene oxide into a chemically-biologically safe glycol compound that is separated. During chemo-sorption a wet-catalytical conversion and/or absorption takes place, i.e., the absorbing medium and/or the catalyst carrier are in a wet state in the presence of a catalyst so that ethylene oxide is subjected to a chemical conversion into a chemically-biologically safe ethylene glycol compound and is separated in this manner. In this method, a self-catalyzing effect is observed additionally in which by formation of ethylene glycol this compound (ethylene glycol) itself becomes a catalyst and therefore further supports the corresponding chemical reaction.

In the oxidation or reduction method step, ethylene oxide is oxidized or reduced by being passed over a wet carrier for the oxidizing or reducing agent, which, depending on the oxidizing or reducing agent used, simultaneously acts as a catalyst and/or as a filling material, by adding an oxidizing or reducing compound in water and thus converted into a chemically-biologically safe compound. Based on the particular physical and chemical properties of ethylene oxide, it is surprising that with the above methods a removal of ethylene oxide in the given mass concentrations as, for example, known from the gas sterilization, is possible. Preferably, the ethylene oxide-containing exhaust gas is passed over the adsorbing medium or absorbing medium or the catalyst carrier or the carrier for the oxidizing or reducing agent in order to thereby achieve an optimal concentration reduction in the ethylene oxide-containing exhaust gas. Accordingly, the adsorbing medium or absorbing medium or catalyst carrier or carrier for the oxidizing agent or reducing agent is optimally exposed to ethylene oxide so that due to a great effective cross-section, on the one hand, the ethylene oxide molecules are separated from the exhaust gas by physically bonding to the great specific surface area of the adsorbing medium and, on the other hand, by already occurring chemical reactions are partially already converted into ethylene glycol and/or into a chemically-biologically safe compound.

Especially suitable for adsorbing, respectively, for chemically converting ethylene oxide is activated charcoal. It can be used as the adsorbing medium or absorbing medium or catalyst carrier or carrier for the oxidizing agent or reducing agent or catalyst or filling material. Especially suitable is activated charcoal produced from stone coal.

Preferably, the activated charcoal is comprised of cylindrically shaped pellets. The diameter of the pellets is preferably in a range of 3 to 5 mm, preferably an average diameter of approximately 4 mm, and the lengths of the pellets is 4 to 13 mm.

The specific surface area of the activated charcoal is preferably between 1,000 to 1,500 $m^2/g$, preferably at an average of approximately 1300 $m^2/g$.

The density after shaking (compacting by vibration) the activated charcoal is preferably between 300 to 400 $kg/m^3$, preferably at an average of approximately 350 $kg/m^3$.

The water content of the activated charcoal is preferably less than 5% by weight. The ash content of the activated charcoal is preferably less than 8% by weight.

As a means for describing the adsorption capacity of the activated charcoal, the loading of the activated charcoal with benzene in an air/benzene atmosphere is used. At 20° C. for at a relative saturation of the air of 0.9 the activated charcoal adsorbs approximately 57% by weight, at a relative saturation of 0.1 approximately 47% by weight, at a relative saturation of 0.01 approximately 24% by weight, and at a relative saturation of 0.001 approximately 13% by weight of benzene. The relative saturation refers to a saturation concentration of 320 g benzene per 1 $m^3$ air at 20° C.

The activated charcoal (activated carbon) with the above properties is available, for example, from Lurgi GmbH, Frankfurt/Main, Germany.

A further inventive embodiment suggests that the adsorbing medium laden with ethylene oxide is regenerated for reuse/further use. Preferably, the adsorbing medium is regenerated with a water rinsing or washing step in which a catalyst is added to the water. The adsorbing medium is subsequently dried with hot air. This allows for a continuous reuse of the adsorbing medium.

In an alternative method using chemo-sorption it is suggested that the absorbing medium and/or the catalyst carrier is regenerated by a water rinsing step whereby a catalyst is added to the water. Preferably, the inventive method is carried out as a batch process and the regeneration step is carried out after each batch operation. This also results in a continuous reuse of the absorbing medium or the catalyst carrier and especially a prevention of a concentration enrichment of problematic ethylene oxide on the absorbing medium or the catalyst carrier. Through contact with the water/catalyst mixture a chemical conversion of the ethylene oxide into ethylene glycol takes place. This chemical conversion occurs already due to the wet state of the absorbing medium or the catalyst carrier due to the presence of the water/catalyst mixture, in any case, however, due to the subsequent water-catalyst washing step so that possibly remaining ethylene oxide molecules are chemically converted into ethylene glycol.

In a further alternative method it is suggested to oxidize or reduce ethylene oxide with an oxidizing or reducing agent upon passing through an oxidizing or reducing agent carrier and to thereby convert the ethylene oxide into a chemically-biologically safe compound.

Preferably, a base or an acid is used as the catalyst, especially suitable is sulfuric acid. The catalyst concentration preferably is 0.1 to 5 more preferred 1 to 2%. It is also possible to use a base as the catalyst.

As an oxidizing or reducing agent a chemical compound is preferably used whose reaction and end product after the reaction with ethylene oxide is preferably chemically-biologically safe. Especially suited are hydrogen peroxide and/or peroxy acetic acid. The concentration of oxidizing or reducing agent is 0.01 to 5%, preferably 0.05 to 1%.

Expediently, the carrier for the oxidizing or reducing agent is converted into a chemically-biologically safe compound by rinsing with water containing the oxidizing or reducing agent. In the alternative, the carrier is regenerated with water containing the oxidizing or reducing agent.

For performing the aforementioned inventive methods, a device is suggested having a container for receiving the adsorbing medium, the absorbing medium, the catalyst carrier, the catalyst, the carrier for the oxidizing or reducing agent, or the filling material, whereby the container has an inlet for the exhaust gas containing ethylene oxide and an outlet for the cleaned exhaust gas.

With an ethylene oxide removal and conversion device according to the inventive technical teachings, a concentration reduction in the ethylene oxide-containing exhaust gas stream is possible in an optimal manner by passing the exhaust gas contaminated with ethylene oxide through the container so that, on the one hand, the ethylene oxide molecules adhere to the great specific surface area of the adsorbing medium due to physical bonding and, on the other hand, are partially already converted by chemical reactions into ethylene glycol and/or into a chemically-biologically safe compound, and wherein by the subsequent water/ 'catalyst rinsing or washing step, respectively, water/ oxidizing agent or reducing agent rinsing step a complete conversion into ethylene glycol and/or into a chemically-biologically safe compound is performed.

Preferably, the container is a tube having a first end with an inlet and a second end with an outlet. Such a tube represents a technically simple means for receiving the adsorbing medium, absorbing medium, catalyst carrier, carrier for the oxidizing or reducing agent, catalyst and/or filling material as well as especially for guiding through the exhaust gas to be cleaned whereby especially the effective cross-section is particularly great.

Preferably the tube is vertically arranged whereby the inlet is at the bottom and the outlet is at the top. The vertical arrangement of the tube has the advantage that ethylene oxide cannot collect in so-called dead spaces because the ethylene oxide is approximately 1.5 times heavier than air.

In order to safely keep the adsorbing medium, absorbing medium, the catalyst carrier, the carrier for the oxidizing agent or reducing agent, the catalyst and/or the filling material within the tube, it is suggested in a further embodiment of the invention to provide mesh elements within the inlet or outlet area (in the vicinity of the inlet or outlet) of the tube.

In a preferred embodiment it is suggested to provide two parallel arranged containers which are identical to one another whereby the two containers can be switched in parallel and operated alternately. This has the advantage that the apparatus which produces ethylene oxide-containing exhaust gas can be operated continuously because two containers for the removal of ethylene oxide are provided whereby, for example, the container not being operated can be regenerated while the other container serves for the removal of ethylene oxide from the contaminated exhaust gas.

In a preferred embodiment of the inventive device the containers are provided with supply and removal lines which are arranged at a slant of preferably 2 to 3% so that in each line a return to the starting point of the supply line, respectively, to a condensate collecting vessel is possible. This takes into consideration that ethylene oxide is approximately 1.5 times heavier than air whereby with the provided slant it is ensured that the dangerous ethylene oxide does not collect in dead spaces where it could prevent a hazard when the device is disassembled. On the other hand, this also prevents ethylene oxide from solidifying at low temperatures as well as the solidification of condensation water resulting from the operation of the device that could lead to a clogging of the lines.

In another embodiment of the present invention it is suggested that the device is provided with monitoring means for pressure, temperature, and CO content so that at any time the control of the device with respect to a safe remediation process is possible.

BRIEF DESCRIPTION OF THE DRAWING

One particular embodiment of the inventive device for removing ethylene oxide from exhaust gas, resulting especially from gas sterilization processes in sterilization chambers and having especially high mass concentrations of up to approximately 1,500,000 mg/m$^3$, is described in the following with the aid of the only schematic drawing.

DESCRIPTION OF PREFERRED EMBODIMENTS

The core of the device is comprised of two containers 1 in the form of vertically extending tubes whereby at the bottom an inlet 2 and at the top an outlet 3 is provided at each tube. Within the two containers 1 a special activated charcoal filling 4 is provided. For preventing its introduction in a downward direction into the respective inlet 2 and in an upward direction into the outlet 3, the tube container 1 is provided at the bottom portion as well as at the top portion with a mesh element 5.

The two containers 1 are connected to an exhaust line system. A feed line 6 is provided which is, for example, connected to a non-represented sterilization chamber for sterilizing objects. In this sterilization chamber ethylene oxide is used as a sterilization gas which, after completion of sterilization, must be removed. For this purpose, the ethylene oxide-containing exhaust gas is guided into the feed line 6 which via a branch 7 opens into the two inlets 2 of the two containers 1. The two inlets 2 each are provided with a shutoff valve 8 and a solenoid 9 so that the feed line 6 can be opened or closed for one respective container 1. A pressure gauge 10, ranging from 0 to 10 bar, a check valve 11, a condensate collecting vessel 12 as well as a check valve 13 are connected within the feed line 6 upstream of the branch 7. Before the check valve 13 a bypass line 14 branches off the feed line 6. The bypass line has a shutoff valve 15 which during normal operation is closed.

At the outlet side the device is provided with a removal line 16 into which the two outlets 3 of the two containers 1 open and which also comprises, as the two inlets 2, a respective shutoff valve 17 and a solenoid 18. With the shutoff valve 17 and the solenoid 18 the removal line 16 can be closed and the respective container 1, for example, for performing a regeneration step, can be removed or respectively switched. The removal line 16 of the two outlets 3 opens into the bypass line 14.

Furthermore, the two containers 1 are connected to a water/catalyst or water/oxidizing or reducing agent rinsing device. This device is comprised of a central supply unit 19 having respective inlet lines for sulfuric acid or hydrogen peroxide and water. Furthermore, a drain 20 as well as a venting device with an activated charcoal filter 21 is provided. With this supply unit 19 water containing a catalyst in the form of sulfuric acid or containing an oxidizing or reducing agent, for example, hydrogen peroxide, is fed into one of the two containers 1. The water/catalyst or water/oxidizing or reducing agent inlet line 22 is provided with a shutoff valve 23, a pump 24, a solenoid 25 and, upstream of the two inlets 2 and downstream of a respective branch line, with a respective flow meter 26. On the outlet side the removal lines 16 are provided with a water/catalyst or water/oxidizing or reducing agent return line 27 which leads into the central supply unit 19. For controlling the corresponding process valves 28, 29, 30 are provided within the lines.

As can be seen in the drawing, all lines are provided with a slant G of 2 to 3% such that the slant points toward the feed line 6, respectively, the condensate collecting vessel 12.

The ethylene oxide removal device functions as follows:

It is initially presumed that the inventive device is being loaded for the first time and that no ethylene oxide has been introduced previously.

The ethylene oxide-containing exhaust gas is fed into the inventive device in the direction of arrow P. The shutoff valve 15 in the bypass line 14 is closed so that the ethylene oxide-containing exhaust gas is guided into one of the two containers 1, i.e., into the container 1 where the corresponding shutoff and solenoid valves 8, 9 are open while at the other container 1 the aforementioned valves are closed. Correspondingly, the shutoff and solenoid valves 17 18 in the removal line 16 are open at the container 1 in operation so that ethylene oxide-containing exhaust gas can flow through the activated charcoal 4 within the respective container 1. Since the activated charcoal 4 during the first loading is still dry, an adsorption of the ethylene oxide molecules takes place. The process control within the corresponding container 1 is carried out with two temperature sensors 31 that are arranged vertically spaced from one another within the corresponding tubular container 1 and which are designed for a maximum temperature of 500° C. Furthermore, a CO monitoring device 32 is provided. During the flow of ethylene oxide-containing exhaust gas through the container 1 a physio-sorption, i.e., an adsorption at the activated charcoal 4 occurs.

In the case that the container 1 in operation is completely saturated, the valves 8, 9, 17, 18 are closed while the corresponding valves at the other container 1 are opened so that accordingly the other container 1 now takes over for the removal of ethylene oxide from the exhaust gas. The completely saturated container 1 can be removed and subsequently regenerated. The regeneration of the completely saturated container 1, respectively, of the activated charcoal 4 contained therein, can be performed by a respective water/catalyst rinsing step with subsequent drying with hot air. With these method steps the ethylene oxide molecules adsorbed on the activated charcoal 4 are converted by the water-catalyst mixture to ethylene glycol and can be removed in the form of a non-hazardous solution of ethylene glycol. After drying with hot air the activated charcoal 4 in the containers 1 can be reused for further ethylene oxide adsorption. Accordingly, an alternating operation the two containers 1 of the device for continuously remedying ethylene oxide-containing exhaust gas is provided.

In the case that within the container 1 a pressure of more than 3 bar is generated, the safety valve 11 functions as a high pressure valve, and the ethylene oxide pressure is released via corresponding lines and via the bypass line 14. When one of the containers becomes defective it is also possible to bypass the defective container with the shutoff valve 15 and to release the ethylene oxide-containing exhaust gas via the bypass (exhaust gas) line 14 directly, for example, into the atmosphere. Water resulting to a greater or lesser extent during operation of the device is collected in the condensate collecting vessel 12 and removed and returned during a downtime of the sterilization apparatus into the central supply unit 19.

In the aforedescribed method variation the activated charcoal 4 in one respective container 1 is loaded batch after batch based on the principle of physio-sorption, i.e., adsorption, with ethylene oxide. Subsequently, the saturated container 1 can be removed and regenerated for reuse in its regenerated state.

However, two further method variations, on the one hand, in the form of a wet-catalytical conversion and/or absorption, and, on the other hand, in the form of an oxidation or reduction of ethylene oxide is possible.

During the wet-catalytical conversion and/or absorption, a regeneration is performed immediately after passing a batch of ethylene oxide-containing exhaust gas resulting from a completed sterilization through the container 1 in operation. For this purpose, the container 1 is rinsed or flushed with water to which the aforedescribed catalyst has been added from the supply unit 19 after opening or closing the respective valves. The water/catalyst mixture is pumped through the container and the ethylene oxide molecules come into contact with the water/catalyst mixture. A chemical conversion in the form of a chemo-sorption and/or absorption takes place resulting in an ethylene glycol solution which is chemically and biologically safe. This ethylene glycol solution is returned into the supply unit 19. After regeneration of the activated charcoal 4 in the corresponding container 1 in this manner the water-catalyst mixture is drained from the corresponding container 1. However, subsequently no drying of the empty container is performed. Instead, the activated charcoal 4 remains in its wet state. In this wet state ethylene oxide-containing exhaust gas from the sterilization chamber is guided in a batch process through the container 1. Due to the wet state of the activated charcoal 4 a combined separation of the ethylene oxide molecules partially in form of chemo-sorption and/or absorption and partially in form of physio-sorption, i.e., adsorption, takes place. It is also possible that a complete separation in form of chemo-sorption and/or absorption takes place. Thus, with the chemo-sorption and/or absorption a partial or complete conversion of the ethylene oxide into ethylene glycol occurs. The remaining ethylene oxide which has not been converted due to the chemo-sorption and/or absorption, but instead has been adsorbed at the activated charcoal, is chemically converted to ethylene glycol in the subsequent regeneration step washing with the water/catalyst mixture. Accordingly, after each batch operation a regeneration with s water/catalyst rinsing step and thus a removal of the ethylene oxide in the container 1 is performed. This prevents especially a concentration enrichment of the adsorbing medium/absorbing medium with the problematic ethylene oxide and ensures a safe operation.

In a further alternative method variant it is suggested to partially oxidize or reduce ethylene oxide guided through the aforementioned container 1, which is also filled with wet activated charcoal 4 as the carrier for an oxidizing or reducing agent, with water having added thereto a suitable oxidizing or reducing agent, preferably hydrogen peroxide. The portion of ethylene oxide, which has not been chemically converted and instead has been adsorbed and/or absorbed on the activated charcoal 4, is chemically converted in the subsequent regeneration step with the water/oxidizing or reducing agent into a chemically-biologically safe compound.

The present invention is, of course, in no way restricted to the specific disclosure of the specification and drawings, but also encompasses any modifications within the scope of the appended claims.

What I claim is:

1. A remediation method for a gas containing high concentrations of more than 1,000 ppm ethylene oxide, said method comprising the steps of:
    a) in the presence of water and a catalyst, simultaneously adsorbing and absorbing ethylene oxide as well as wet-catalytically converting ethylene oxide to ethylene glycol on a material that acts simultaneously as an absorbing medium, an adsorbing medium, and a catalyst carrier;
    b) rinsing said material with water in the presence of the catalyst and thereby converting remaining and incompletely converted ethylene oxide of step a) to ethylene glycol; and
    c) repeating steps a) and b) when needed.

2. A method according to claim 1, wherein said material is activated carbon.

3. A method according to claim 2, wherein said activated carbon is in the form of cylindrical pellets.

4. A method according to claim 3, wherein said cylindrical pellets have a diameter of 3 to 5 mm and a length of 4–13 mm.

5. A method according to claim 4, wherein said pellets have an average diameter of 4 mm.

6. A method according to claim 2, wherein said activated carbon has a specific surface area of 1000 to 1500 m²/g.

7. A method according to claim 6, wherein said activated carbon has an average specific surface area of 1300 m²/g.

8. A method according to claim 2, wherein said activated carbon has a density after shaking of 300 to 400 kg/m³.

9. A method according to claim 4, wherein said activated carbon has a density after shaking of 350 kg/m³.

10. A method according to claim 2, wherein said activated carbon has a water content of less than 5% by weight before use.

11. A method according to claim 2, wherein said activated carbon has an ash content of less than 8% by weight.

12. A method according to claim 2, wherein said activated carbon has an adsorption capacity for benzene in an air/benzene atmosphere defined by a saturation concentration of 320 g benzene in 1 m³ air at 20° C. of 57% by weight at a relative saturation of 0.9, of 2% by weight at a relative saturation of 0.1, of 24% by weight at a relative saturation of 0.01, and of 13% at a relative saturation of 0.001.

13. A method according to claim 1, further comprising the step of, after step b), regenerating said material for reuse.

14. A method according to claim 1, wherein said catalyst is an acid.

15. A method according to claim 14, wherein said acid is sulfuric acid.

16. A method according to claim 1, wherein said catalyst is a base.

17. A method according to claim 1, further comprising the step of supplying the catalyst at a concentration of 0.1 to 5%.

18. A method according to claim 17, wherein the catalyst concentration is 1 to 2%.

19. A remediation method for a gas containing high concentrations of more than 1,000 ppm ethylene oxide, said method comprising the steps of:
a) wetting activated carbon with water containing a catalyst;
b) guiding the gas containing ethylene oxide over the activated carbon;
c) in the presence of water and said catalyst, simultaneously adsorbing and absorbing ethylene oxide as well as wet-catalytically converting ethylene oxide to ethylene glycol on said activated carbon that acts simultaneously as an absorbing medium, an adsorbing medium, and a catalyst carrier;
d) rinsing said activated carbon with water containing said catalyst and thereby converting remaining and incompletely converted ethylene oxide of step c) to ethylene glycol; and
e) repeating steps b), c) and d) when needed.

* * * * *